Jan. 6, 1925.
J. C. FIDDYMENT
1,522,109
MEANS FOR SHARPENING CUTTING TOOLS
Filed March 28, 1921  2 Sheets-Sheet 1
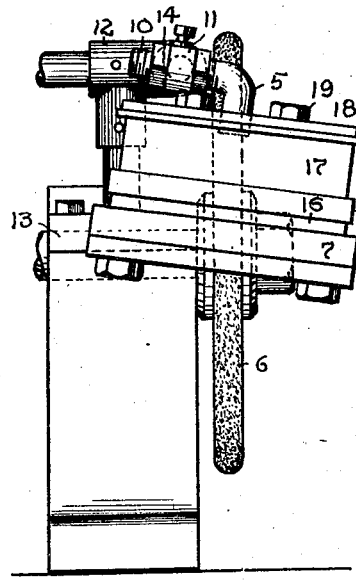
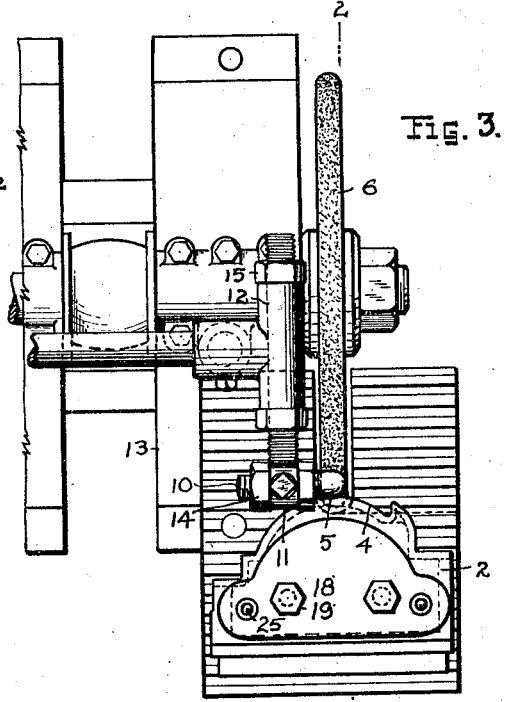
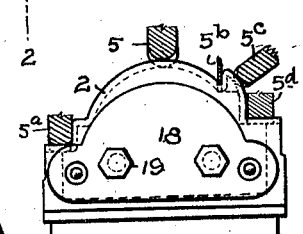
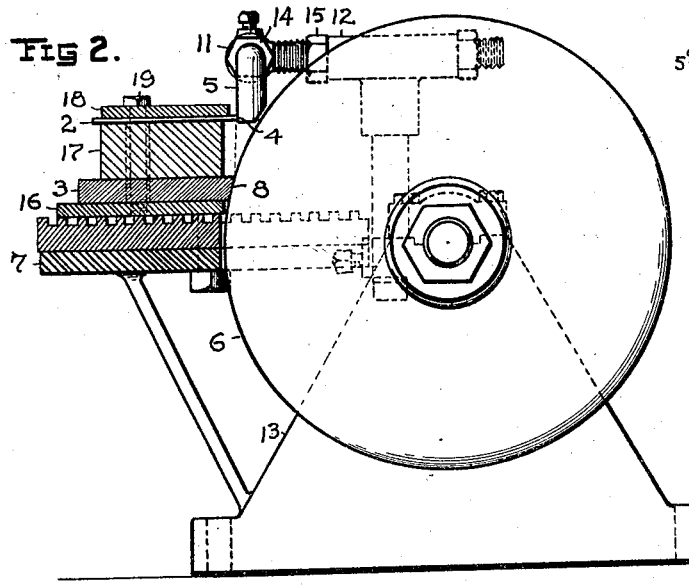
Inventor
J.C. FIDDYMENT.
By Fisher ＿＿＿
Attorneys Jan. 6, 1925.  
J. C. FIDDYMENT  
1,522,109  
MEANS FOR SHARPENING CUTTING TOOLS  
Filed March 28, 1921 2 Sheets-Sheet 2
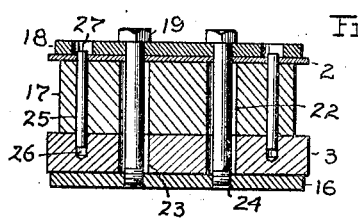
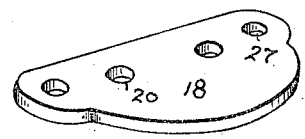
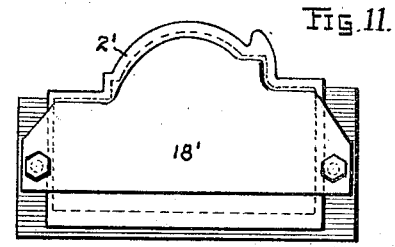
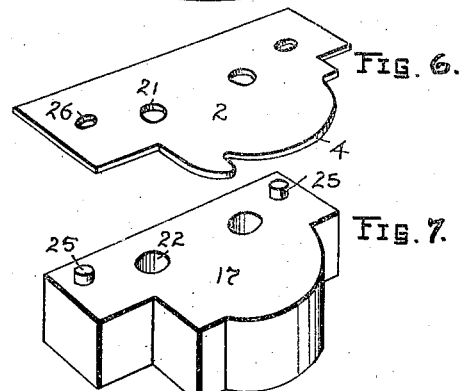
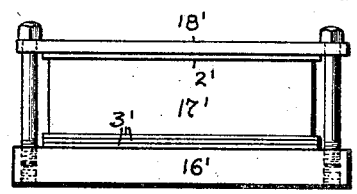
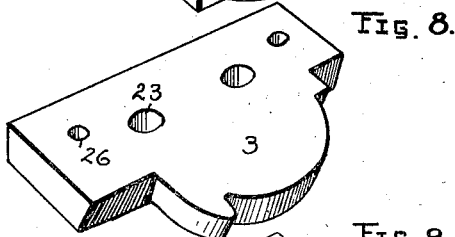
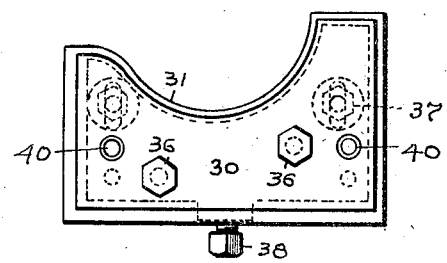
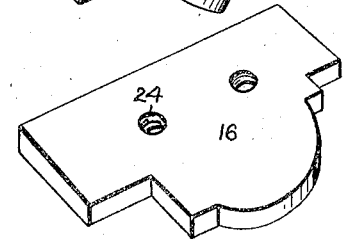
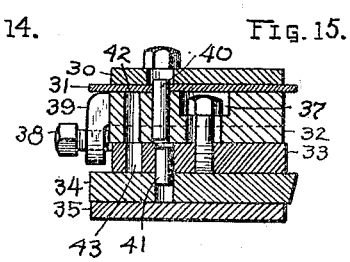
Inventor  
J. C. FIDDYMENT.  
Fisher & Mosert  
Attorneys Patented Jan. 6, 1925.

1,522,109

UNITED STATES PATENT OFFICE.

JOHN C. FIDDYMENT, OF AKRON, OHIO.

MEANS FOR SHARPENING CUTTING TOOLS.

Application filed March 28, 1921. Serial No. 456,113.

*To all whom it may concern:*

Be it known that I, JOHN C. FIDDYMENT, a citizen of the United States, residing at Akron, in the county of Summit and State of Ohio, have invented certain new and useful Improvements in Means for Sharpening Cutting Tools, of which the following is a specification.

The present invention involves a new and useful means for grinding and sharpening cutting tools by the aid of the template, and as exemplified herein the invention is especially applicable to the work tools or cutters employed in finishing tire molds and cores of irregular shape. Thus, in the accompanying drawings, Fig. 1 is a front elevation of a grinding machine and a work holder and a template constructed and associated together according to my invention. Fig. 2 is a side view and section of the machine on line 2—2, of Fig. 3. Fig. 3 is a plan view of the assembly of parts shown in Fig. 2. Fig. 4 is a diagram of a working unit engaged with different forms of stops. Figs. 5, 6, 7, 8 and 9, are perspective views of the several parts which are united together and handled as a unit in producing, reproducing, grinding or sharpening a given piece of work. Fig. 10 is a sectional view of the parts delineated in Figs. 5 to 9, united together. Figs. 11 and 12 are plan and front views, respectively, of a modified form of working unit used in producing duplicate templates, and Figs. 13, 14 and 15 are plan, front and section views, respectively, of a further modification showing a template and tool for forming cores.

The molds used in making tires, or tire casings generally comprise two annular sections having flat meeting faces and an endless molding cavity of irregular circular outline in cross section. In finishing the meeting face and the surfaces of the cavity in a given mold section a single cutter blade of corresponding outline is usually employed. As a preliminary step a master template is made, and duplicate templates are also made to gauge the work being done on the mold section by the cutters. These templates are also used as a guide in sharpening the cutter blades. My own mode is to unite a template 2 and a cutting blade 3 together in spaced relation with the template above the blade where the guide edge 4 of the template may be projected and held against a fixed stop 5 situated directly above the periphery of a grinding wheel 6 rotating in a vertical plane opposite an inclined table 7 upon which the cutter blade is supported in any suitable way so that an undercut bevel 8 may be produced on the blade by the circular wheel to give the requisite clearance behind the cutting edge of the tool in cutting operations. Table 7 is inclined transversely to the plane of rotation of the wheel to permit a similar clearance bevel to be produced on the tool where the cutting edge deviates or is of such formation that grinding must be effected on the flat side of the grinding wheel. In this connection it should be understood that various forms of grinding wheels are used to produce the irregular cutting edges in a tool 3 such as illustrated in Fig. 8, and the stop 5 should have the same outline as the grinding edge of the wheel selected. In Fig. 4 I show several different forms of stops $5^a$, $5^b$, $5^c$ and $5^d$, in section as engaged with template 2, but this showing is merely diagrammatic as only one such stop and a corresponding wheel is used at one and the same time.

Stop 5 may be supported in various ways but as shown it comprises a screw-threaded stem 10 extending transversely through the end of an eye bolt 11 which is mounted within head 12 of a vertically-adjustable post on frame 13 of the machine. Nuts 14 clamp stem 10 rigidly within the end of the bolt and permit longitudinal and rotary adjustments of the stem to set stop 5 in different positions opposite the edge of the grinding wheel, and nuts 15 clamp the eye bolt rigidly upon head 12 and permit rotary and longitudinal adjustments of this bolt whereby the stop may be inclined in respect to the plane of rotation of the wheel and stationed at different distances away from the peripheral edge thereof. It is important that the stop shall have the same shape as the cutting portion of the wheel and that it be lined up accurately to that part of the wheel where the cutting edge of the tool engages the wheel, especially in finishing the sharpening operation. Where the stop is the same in cross section as the wheel it is impossible to sharpen the tool excepting in accordance with the outline of the template.

In Fig. 2 I show the cutting blade or tool 3 engaged with grinding wheel 6 and the template engaged with stop 5, and blade 3 is shown as resting upon a shim or leveling plate 16 to raise the blade to a slighter higher level than the horizontal axis of the grinding wheel so that a cutting edge will be produced on the blade in line with the guide edge of the template at the curved periphery of the grinding wheel. The template is supported a predetermined distance above the blade or tool by a spacing block 17, and a clamping plate 18 is seated upon the template and united with the bottom shim or leveling plate 16 by means of bolts 19 which extend through registering openings 20, 21, 22, 23 and 24, respectively in the five members which constitute a working unit in grinding operations. Tool 3 is first roughed out to approximately the desired shape and the template placed upon it and the dowel holes made therein. Spacing block 17 is then provided with dowel pins 25 which extend a short distance beyond the flat top and bottom faces of the block so that they may enter the dowel openings 26 in the template 2 and tool 3 when the block is interposed between the template and tool. Clamping plate 18 also has openings 27 opposite the dowel pins which project through the relatively thin template.

The angle or clearance at the cutting edge of the tool can be increased by raising the tool to a higher contact point with the grinding wheel, either by substituting a thicker shim plate or a higher table, or the angle of the table may be changed. By using a stop having the same shape in cross section as the peripheral grinding face or the side of the wheel it is possible to produce a cutting edge having the exact shape of the template and at the same time give the proper working clearance, and to facilitate operations a number of grinding stands having different shaped stops and grinding faces may be utilized to produce an irregular cutting edge according to a given pattern or template. The stops would be adjusted to a given working unit, and this is one advantage of uniting the tool and template together in an assembly of parts as described. If the tool or cutter plate is placed at either side of the horizontal center of the grinding wheel, it is possible to produce the desired clearance behind the cutting edge, but to place the tool below the center line would necessitate inverting some of the parts and a slightly different assembly. As herein disclosed the stop and the template and the cutting edge of the tool are exposed and plainly visible at all times to the operator and it is only necessary for him to maintain the guide edge of the template against the stop and shift the unit on the table in grinding the cutting edge to correspond with the template.

In Figs. 11 and 12 I show a modified form of unit comprising a clamping plate 18′, a template 2′, a spacing block 17′, and three thin metal pieces 3′ clamped between spacing block 17′ and a base member 16′. This assembly of parts illustrates the applicability of the invention to the making of a plural number of templates corresponding to the master template, the pieces 3′ representing the duplicate templates. However, the grinding of the duplicate templates must be accomplished without giving any clearance, that is the edge must be ground square, which is done by grinding with the flat side of the wheel or radially of the wheel.

In Figs. 13, 14 and 15 I show a still further modification of a working unit in which a clamping plate 30 is used to fasten a template 31 upon the top face of a spacing block made in two sections 32 and 33, and in which a cutter plate 34 is clamped against bottom section 33 by a base or shim plate 35 through the medium of a pair of bolts 36 extending through the aforesaid parts. Spacing sections 32 and 33 are united by independent bolts 37 and are slidably or adjustably related, a set screw 38 being projected through a depending lug 39 on section 32 so that screw 38 may bear against the lower section 33 to effect a forward movement of said section. A dowel pin 40 in upper section 39 fixes template 31 thereon, and a separate dowel pin 41 affixes the cutter 34 to the lower section 33. With this arrangement if the tool has been distorted in tempering or if the template is improperly positioned the template and tool may be adjusted within limits so as to provide sufficient stock in the tool to grind the cutting edge properly. Separate dowel openings 42 and 43 may also be provided in sections 32 and 33 to permit other dowel pins to be inserted in lining up these sections initially.

What I claim is:

1. A means for grinding or sharpening tools by the aid of a template, comprising a stand having a grinding wheel and a table, a vertically adjustable post having an adjustable stop member mounted thereon opposite the edge of said grinding wheel and in combination with means adapted to hold the work and a template in spaced relation movably upon said table opposite said stop member and said wheel.

2. A means for grinding or sharpening tools by the aid of a template, comprising a rotatable grinding wheel, a table inclined transversely in respect to the plane of rotation of said wheel, a stop member extending opposite the periphery of the grinding wheel above said inclined table, and means adapted to adjust said stop member vertically and horizontally and rotatably in respect to the periphery of said wheel, in combination with a work holder having a template adapted to engage said stop member, and work holder and template being adapted to be seated together and held in the operators hands in a freely movable rest position upon said table with the template engaging said stop member.

3. A means for grinding or sharpening tools by the aid of a template, comprising a rotatable grinding wheel, a table opposite said wheel, a stop member extending in front of said wheel, rotatable support for said stop member adapted to permit the stop to be inclined in respect to the plane of rotation of the wheel, and adjustable holding means for said support adapted to permit said stop member to be stationed at different distances from the peripheral edge of the wheel, in combination with a work-holder adapted to be seated upon said table and a template carried by said work-holder adapted to engage said stop.

4. A means for grinding or sharpening tools by the aid of a template, comprising a rotatable grinding wheel, a horizontally inclined table adjacent the guiding face of the wheel, a vertically-adjustable post adjacent said wheel, a stop supporting part rotatably mounted upon said support, a horizontally adjustable bolt supported by said post and a stop member of angular form rotatably secured upon said bolt and adjustable transversely of the cutting face of the wheel.

Signed at Akron, in the county of Summit, and State of Ohio, this 25th day of March, 1921.

JOHN C. FIDDYMENT.